Jan. 5, 1965 F. B. REDMAN 3,164,336
COIL WINDING APPARATUS
Filed Oct. 18, 1960 3 Sheets-Sheet 1
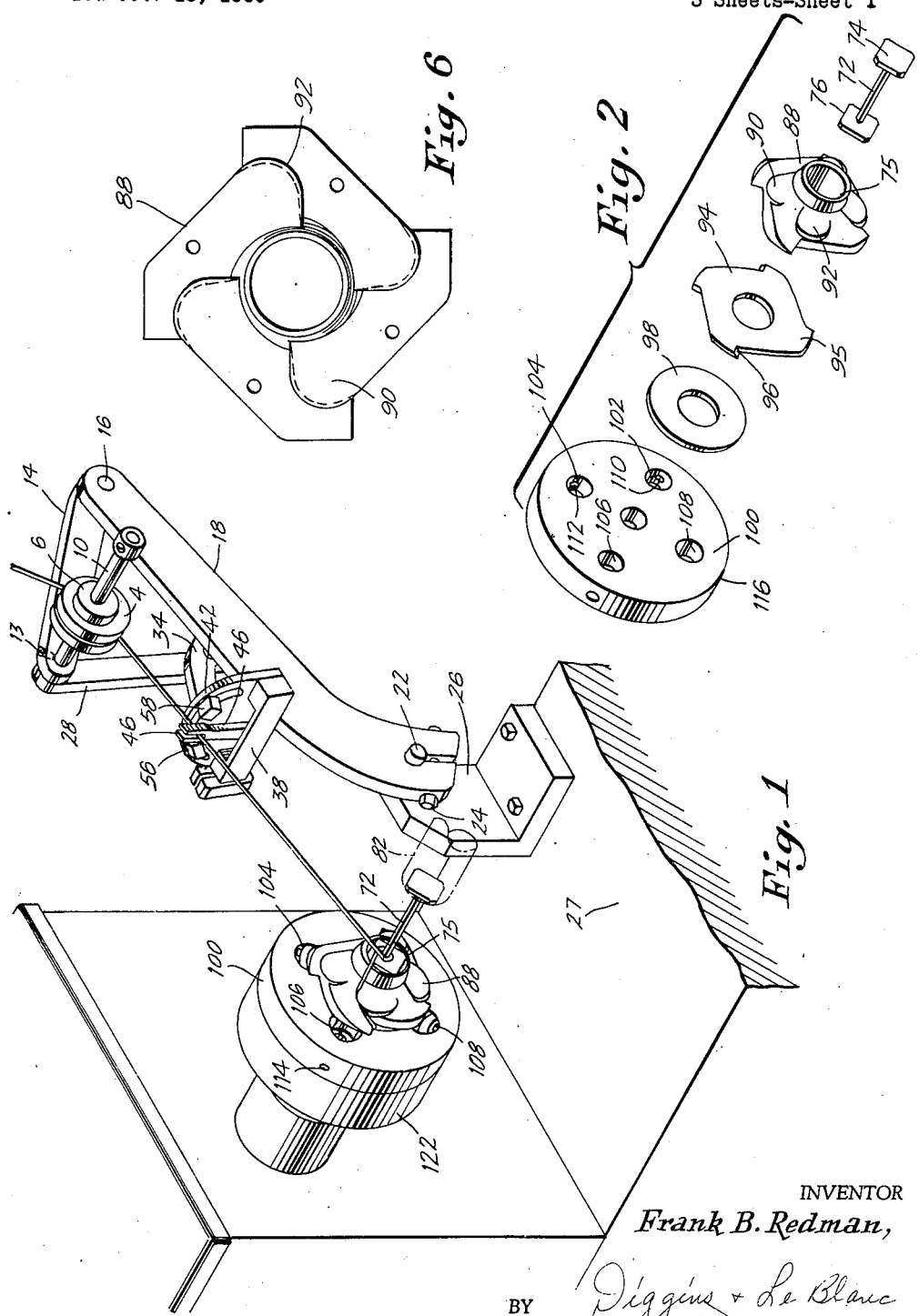
INVENTOR
*Frank B. Redman,*
BY *Diggins & LeBlanc*
ATTORNEYS Jan. 5, 1965   F. B. REDMAN   3,164,336
COIL WINDING APPARATUS
Filed Oct. 18, 1960   3 Sheets-Sheet 2
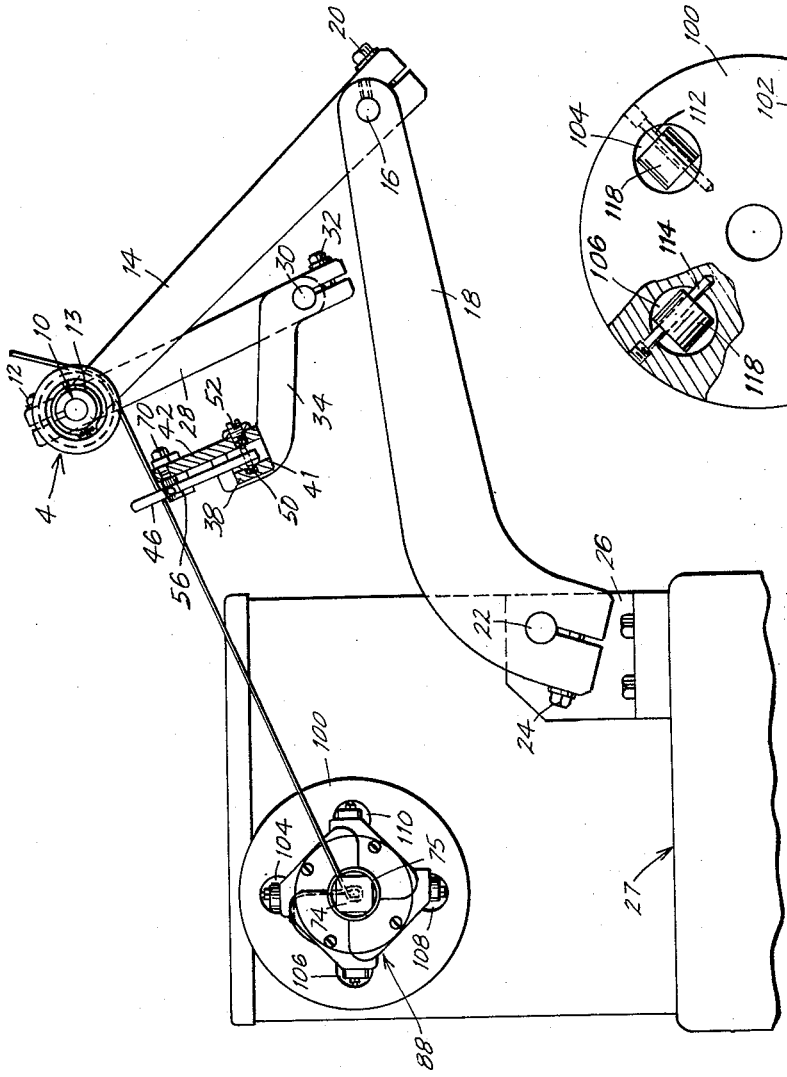
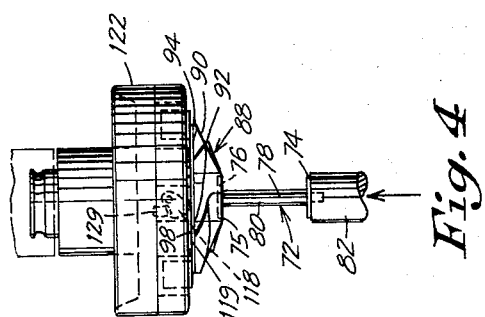
INVENTOR
*Frank B. Redman,*
BY *Diggins + LeBlanc*
ATTORNEYS

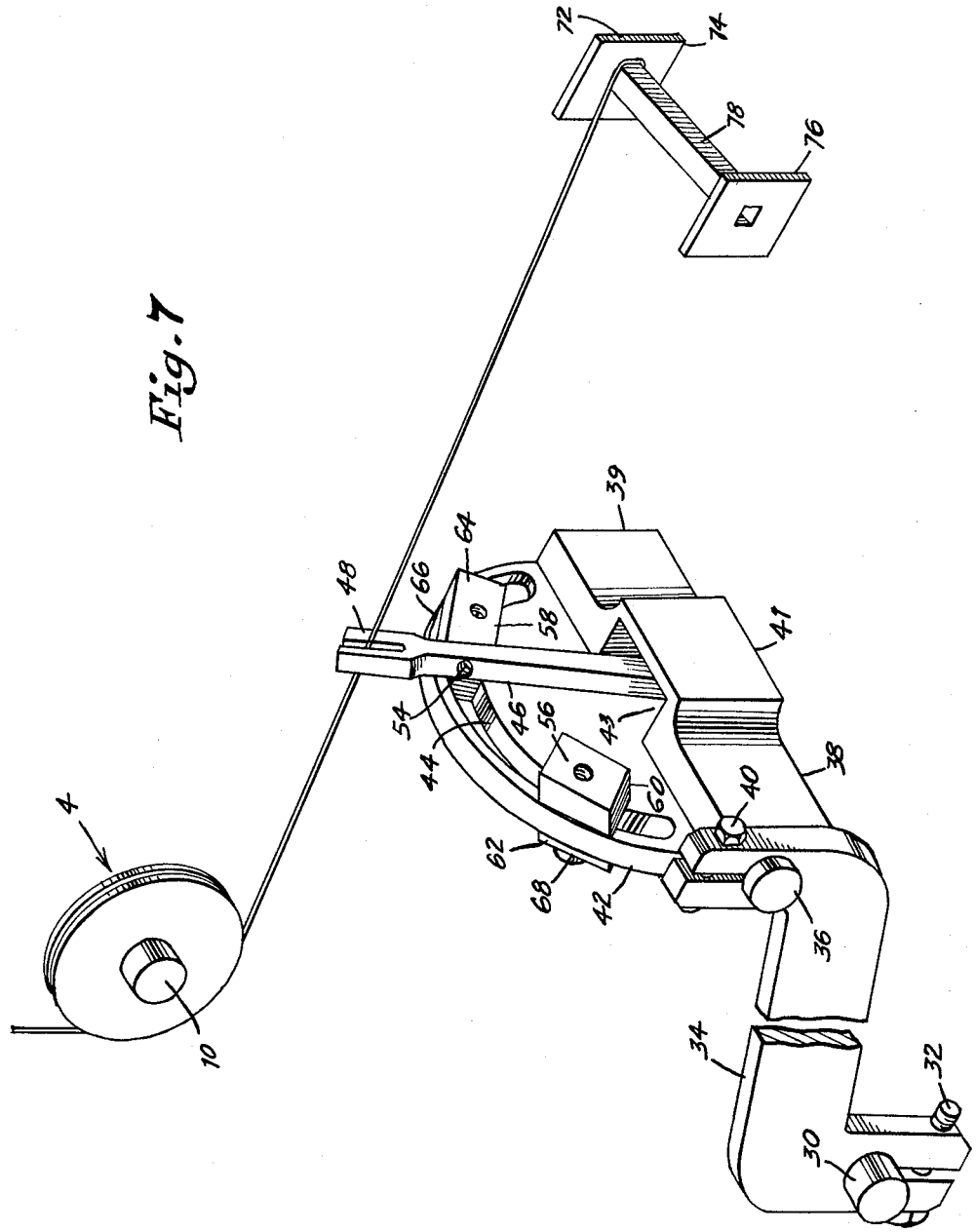

United States Patent Office 3,164,336
Patented Jan. 5, 1965

3,164,336
COIL WINDING APPARATUS
Frank B. Redman, Lancaster, Pa., assignor to Hamilton Watch Company, Lancaster, Pa., a corporation of Pennsylvania
Filed Oct. 18, 1960, Ser. No. 63,362
6 Claims. (Cl. 242—158)

This invention relates to coil winding apparatus and more particularly relates to an improved apparatus for providing uniformly wound wire coils.

The need for an inexpensive and efficient apparatus for winding electrical coils has long been recognized. The cost of electrical coils of relatively thin wire, such as those used in electric watches, has remained disproportionately higher than the cost of their component materials due to the elaborate and expensive machinery now required to uniformly wind such a coil. Since the wire wound on a bobbin or core will tend to concentrate at the middle or center of the bobbin or core, some machinery is necessary to insure that the wire will be uniformly wound along the entire length of the bobbin. Apparatus now used for performing this function takes many forms, all of them relatively intricate and consequently expensive. Apparatus such as those using a system of cams and cam followers or those using precisely timed traverse mechanisms have been found satisfactory, but can only be provided at great expense. Due to their complexity they are also extremely liable to mechanical failure, thus seriously hindering the mass production of coils.

According to the present invention, it has now been found that it is possible to provide a magnetically assisted wire guiding arm which may be used in conjunction with a sliding pulley and novel bobbin supporting apparatus to uniformly wind electric coils both inexpensively and simply.

It is therefore one of the objects of the present invention to provide apparatus for uniformly winding electric coils.

It is another object of this invention to provide a novel wire guiding mechanism.

It is also an object of this invention to provide a novel rotating structure for attachment to a turning machine for supporting a bobbin.

It is a further object of this invention to provide a novel bobbin supporting structure incorporating improved starting guide means and wire cut-off means.

It is another object of this invention to provide an improved starting guide plate for coil winding apparatus.

These and further objects and advantages of the invention will become more apparent upon reference to the following specification and claims and appended drawings wherein:

FIGURE 1 is a perspective view of the coil winding apparatus of the present invention;

FIGURE 2 is an exploded perspective view of the bobbin supporting apparatus;

FIGURE 3 is an end view partly in section of the coil winding apparatus of the present invention;

FIGURE 4 is a plan view of the bobbin supporting structure;

FIGURE 5 is a front view, partly in section, of the chuck used in the present invention;

FIGURE 6 is a front view of the starting guide plate used in the present invention; and FIGURE 7 is a perspective view of the wire guiding assembly of the present invention.

Referring now to the several figures, and particularly to FIGURES 1 and 3, a wire to be wound onto a bobbin to form a coil is fed from a wire source, not shown, to the underside of a sliding pulley 4. This pulley can be of any well known design, and is preferablyy mounted on a ball bushing 6 for slidable axial movement along a cylindrical guide rod 10. The guide rod 10 is carried by a linkage member 14 and may be locked in place byy means of a set screw 13. The other end of the linkage member 14 is provided with a split joint which is adapted to receive a pin 16 mounted near one end of a linkage member 18. The split joint may be tightened around pin 16 to lock the members 14 and 18 in a desired angular relationship by means of the bolt 20. In a similar manner, the other end of the linkage member 18 is provided with a split joint which is adapted to receive a pin 22 mounted on a tab 26 located in any suitable position on the base 27 of any conventional turning machine. A bolt 24 is provided for tightening the split joint around the pin 22 to lock the linkage member 18 in any desired angular position. Although split joints and pins are used in the preferred embodiment, any suitable locking device may be used.

A third linkage member 28 is mounted on the guide rod 10 and is provided with a split joint for this purpose. When the linkage member 28 and the linkage member 14 are positioned in the desired angular relationship, the split joint is tightened by means of a bolt 12, locking the members in place. The linkage member 28 carries at its other end a pin 30 which is clamped by a split joint provided in one end of a linkage member 34. As in the case of the other joints, this joint may be tightened by means of a bolt 32 to lock the members 28 and 34 in a desired angular relationship. The other end of the linkage member 34 is also provided with a split joint for clamping a pin 36 (FIGURE 7) carried by a wire guide assembly generally indicated at 38. A bolt 40 may be used to tighten this joint.

Referring to FIGURE 7, the wire guide assembly 38 is provided with a rear plate 42 and a front plate 39, which plates may be formed integrally or fastened togther in any well known manner. The rear plate is provided with a semicircular slot 44. The front plate 39 is formed with an offset portion 41 to provide a gap 43 between the face plate and the rear plate of the wire guide. Centrally located in this gap is a pivot bearing 50 which can be adjusted by means of a set screw 52, as best shown in FIGURE 3.

Mounted for pivotal movement on this pivot bearing 50 is an arm 46 having a forked or bifurcated end 48 for engaging the wire to be wound. If desired, the fingers forming the forked end of this arm may be closed at the tips so that the wire cannot become disengaged. The arm 46 carries a small permanent magnet 54 mounted therein at a point so chosen that the path of motion described by this magnet as the arm is rotated about the pivot 50 will be approximately equivalent to the semicircular slot 44.

A pair of attracting blocks 56 and 58 composed of a suitable ferromagnetic material are mounted in the slot 44. The blocks 56 and 58 are made up of face plates 60 and 64 and rear blocks 62 and 66 respectively, held together by bolts 68 and 70. By use of this arrangement, these blocks may be positioned at any desired location in the slot so that their positions may be made to correspond to the length of a bobbin or core being wound.

In the operation of the apparatus just described, a bobbin 72 is rotated by any suitable machine. As the wire pays off from the supply source and passes around the pulley 4, the centralized position of the pulley causes a tendency in the wire to wind toward the center of the bobbin whenever the slightest break in continuity of winding occurs. As a layer of wire is wound toward the end of the bobbin, the wire tension toward the center increases. Normally, the wire tension would overcome the normal free winding proclivity of the wire to approach or reach the end of the bobbin and the wire would be pulled back toward the center of the bobbin, causing a greater number of turns in the center than on the ends.

However, by the use of the present wire guide assembly, this tendency to prematurely reverse the winding direction is overcome.

As the wire approaches the end of the bobbin, the magnet 54 carried by the arm 46 begins to exert an attracting force on the magnetic block located in the slot 44 in a position corresponding to the end of the bobbin. This attracting force is greater than the reversing force caused by wire tension and the arm is drawn to the block, thus winding the wire to the very end of the bobbin. The magnetic attraction will hold the arm next to the block for the first few turns of the next wire layer which immediately starts in the opposite direction, thus assuring close winding to the very end of the bobbin, and the arm is then pulled away from the block by the forces exerted by the wire and swings free to repeat the procedure at the opposite end of the bobbin.

Referring now to FIGURES 2, 4, 5 and 6, an improved bobbin supporting means including a wire latch, starting guide plate, and wire cut-off plate is provided. As can be seen, each end of the bobbin 72 is provided with a rectangular end plate 74 and 76. The end plate 74 is supported by the tail stock 82 of the turning machine. The other end plate 76 of the bobbin 72 is supported by a cylindrical member 75 which has a circular recession whose diameter is approximately equal to the diagonal of the rectangular end plate 76. The end plate is inserted into this recession and the tail stock of the machine positioned to hold the bobbin firmly in place. The composite part 75 comprises a starting guide plate 88, a cut-off plate 94, a spacing plate 98, a chuck 100, and abuts against the face plate 122 of the turning machine.

The starting guide plate 88 is preferably formed of a plastic material such as lucite, although any suitable material may be used. This plate is provided with a plurality of raised sections 90. Each of these sections is inclined so that the uppermost portion forms a laterally extended projection from the face of the guide plate. The uppermost portions of the projections are rounded and provided with undercuts to form grooves or guides 92 for receiving the wire. Four of these sections are shown in the preferred embodiment, each covering 90° of the surface of the plate, but if desired any number could be used.

A wire cut-off plate 94 is provided adjacent the starting guide plate 88. This cut-off plate has a shape similar to the underside of the starting guide plate and has no raised projections. The cut-off plate thus has a plurality of radially extending projections 95, each of which is provided with a cutting edge 96, which extends slightly beyond the corresponding portions of the starting guide plate 88. This plate can be made of any suitable material, for example, steel, which can be provided with the cutting edges 96.

The spacing plate 98 is preferably made of brass or any similar material and preferably is positioned between the wire cut-off plate and the chuck 100. It is circular in shape and has a diameter small enough to allow the radial extensions of the cut-off plate to extend beyond it.

The chuck 100, best shown in FIGURE 5, is constructed to cooperate with the cut-off plate to form a coil winding wire latch. The accomplish this purpose, the chuck is provided with a number of apertures 102, 104, 106 and 108. Each of these apertures has associated therewith radially extending rods 110, 112, 114 and 116 respectively. These rods extend across the apertures and are mounted in the chuck in any suitable fashion. Mounted on each of these rods is a cam type wire latch 118. Each wire latch is provided with a recess 119 to receive one end of a coil spring 120 which acts to force the cam type wire latch outward into contact with the rear side of the cut-off plate 94 as best shown in FIGURE 4. The coil winding machine face plate 122 is located adjacent to the chuck 100 and is provided with taps to receive the other ends of springs 120. The wire guide plate, cut-off plate, spacing plate, and chuck are all bolted in any suitable manner to the wire machine face plate.

In the operation of the above described apparatus, the free end of the wire is passed around the pulley 4 through the fingers of the wire guide arm 46, and drawn forward and latched between one of the spring biased cams 118 and the rear side of the cut-off plate 94. The turning machine is started and the wire follows the groove or guide 92 provided in the raised portion 90 of the wire guide plate which is directly related to the spring biased cam 118 which has locked the wire end. The wire slides from the guide plate to the bobbin or core 72. As the bobbin or core 72 rotates, the normal free winding effect causes a layer of wire to be wound.

As the beginning of the operation, the wire guide arm 46 was in contact with the attracting block 56, due to the magnetic attraction between them. As the wire being wound leaves the starting end of the bobbin, and travels toward the center of the bobbin, the arm 46 is drawn away from the attracting block 56 and is guided by the wire. As the wire passes the center of the bobbin and nears the other end, the arm 46 is attracted by the attracting block 58 causing the wire to be laid all the way to the other end of the bobbin, where it then reverses direction and pulls the arm 46 away from the attracting block 58. The wire then travels toward the original starting end of the bobbin and the process is repeated over and over until the desired number of layers have been wound on the bobbin or core 72.

When the desired number of layers have been wound, the turning machine is stopped and the operator grasps the wire near the wire guide arm 46 and draws it into latching position between one of the cams 118 and the rear side of the cut-off plate 94. The wire is severed by drawing it back against one of the cutting edges 96 of the cut-off plate. The fully wound bobbin can then be removed and the apparatus is prepared to perform another similar cycle.

By the use of the apparatus described, a coil can be wound simply and cheaply. No complicated equipment is necessary to provide a uniform lay, but only a wire guiding means pivotally mounted between two magnetic attracting blocks. By the use of this apparatus, the coil can be started and finished with the assurance of leads of sufficient length in a simple and expeditious manner.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patents is:

1. In a coil winding apparatus, a bobbin to be wound, reciprocatable wire guiding means to direct a wire to said bobbin, said wire guiding means having a path of movement corresponding to the length of said bobbin, and unidirectional magnetic attracting means adjacent the ends of the path of movement of said guiding means, said attracting means acting on said wire guiding means only over the end portions of said path of movement, said attracting means exerting maximum attractive force on said guiding means at the ends of its path of movement so as to hold said guiding means stationary for short periods of time at the ends of its travel to insure even winding of wire at the ends of said bobbin.

2. In a coil winding apparatus, a bobbin to be wound, wire guiding means to direct a wire to said bobbin mounted for reciprocation in a plane parallel to the longitudinal axis of said bobbin, said wire guiding means having a path of movement corresponding to the length of said bobbin, and unidirectional magnetic attracting means adjacent the ends of the path of movement of said guiding means, said attracting means acting on said wire guiding means only over the end portions of said path of movement, said attracting means exerting maximum attractive force on said guiding means at the ends of its path of movement so as to hold said guiding means stationary for short periods of time at the ends of its travel to insure even winding of wire at the ends of said bobbin.

3. In a coil winding apparatus, a bobbin to be wound, a pulley, said pulley being slidably movable in a path parallel to the longitudinal axis of said bobbin, a support, wire guiding means pivotally mounted on said support to direct a wire to said bobbin, said guiding means being pivotally mounted for rotatable reciprocation in a plane parallel to the longitudinal axis of said bobbin, said wire guiding means having a path of movement corresponding to the length of said bobbin, and unidirectional magnetic attracting means mounted on said support adjacent the ends of the path of movement of said guiding means for attracting said wire guiding means when said wire guiding means is located a predetermined distance from said attracting means, said attracting means being adjustably mounted on said support and acting as a stop for limiting the pivotal movement of said wire guiding means.

4. In a coil winding apparatus, a wire guiding device comprising in combination, a support, wire guide means pivotally mounted on said support, magnetic attracting means for attracting said wire guide means when said wire guide means is located a predetermined distance from said attracting means, said attracting means being adjustably mounted on said support and acting as a stop for limiting the pivotal movement of said wire guide means.

5. In a coil winding apparatus, a wire guiding device comprising in combination, a support, a wire guiding arm pivotally mounted on said support, said arm being provided with means for engaging a wire to be wound, and magnetic attracting means mounted on said support, said attracting means attracting said arm when said arm is a predetermined distance from said attracting means said attracting means exerting maximum attractive force on said wire guiding arm at the ends of its path of movement so as to hold said guiding arm stationary for short periods of time at the ends of its travel to insure even winding of wire at the ends of said coil.

6. The combination of claim 5 wherein said arm carries a permanent magnet and travels either toward or away from said attracting means.

References Cited in the file of this patent
UNITED STATES PATENTS

| | | |
|---|---|---|
| 1,856,140 | Shirley et al. | May 3, 1932 |
| 2,243,624 | Gazet | May 27, 1941 |
| 2,362,179 | Weber | Nov. 7, 1944 |
| 2,618,440 | Scott et al. | Nov. 18, 1952 |
| 2,643,068 | Harris | June 23, 1953 |
| 2,713,980 | Roberts et al. | July 26, 1955 |
| 2,964,260 | Edelman et al. | Dec. 13, 1960 |

FOREIGN PATENTS

| | | |
|---|---|---|
| 901,948 | France | Nov. 20, 1944 |